H. L. TANNER.
ELECTRICAL POSITION INDICATOR.
APPLICATION FILED JUNE 5, 1915.

1,332,312.

Patented Mar. 2, 1920.
3 SHEETS—SHEET 1.

INVENTOR.
Harry L. Tanner
BY Herbert H. Thompson
ATTORNEY.

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

ELECTRICAL POSITION-INDICATOR.

1,332,312.  Specification of Letters Patent.  Patented Mar. 2, 1920.

Application filed June 5, 1915. Serial No. 32,254.

*To all whom it may concern:*

Be it known that I, HARRY L. TANNER, a citizen of the United States of America, residing at 221 Eastern Parkway, Brooklyn, New York, have invented certain new and useful Improvements in Electrical Position-Indicators, of which the following is a specification.

My invention relates to apparatus for indicating the range of a distant object. As is well known, the accuracy of such instruments is greatly increased by employing a long base line, that is by separating the two sighting instruments as far as possible. The usual method employed in these long base instruments is to transmit electrically the angle that each telescope makes with the base line to a central point where the readings are combined in some manner by which the range may be obtained.

The main object of my invention is to improve the construction of the electrical transmitting mechanism whereby the greatest possible accuracy is obtained. Other objects of my invention will become apparent as I describe my invention in detail.

Figure 1:
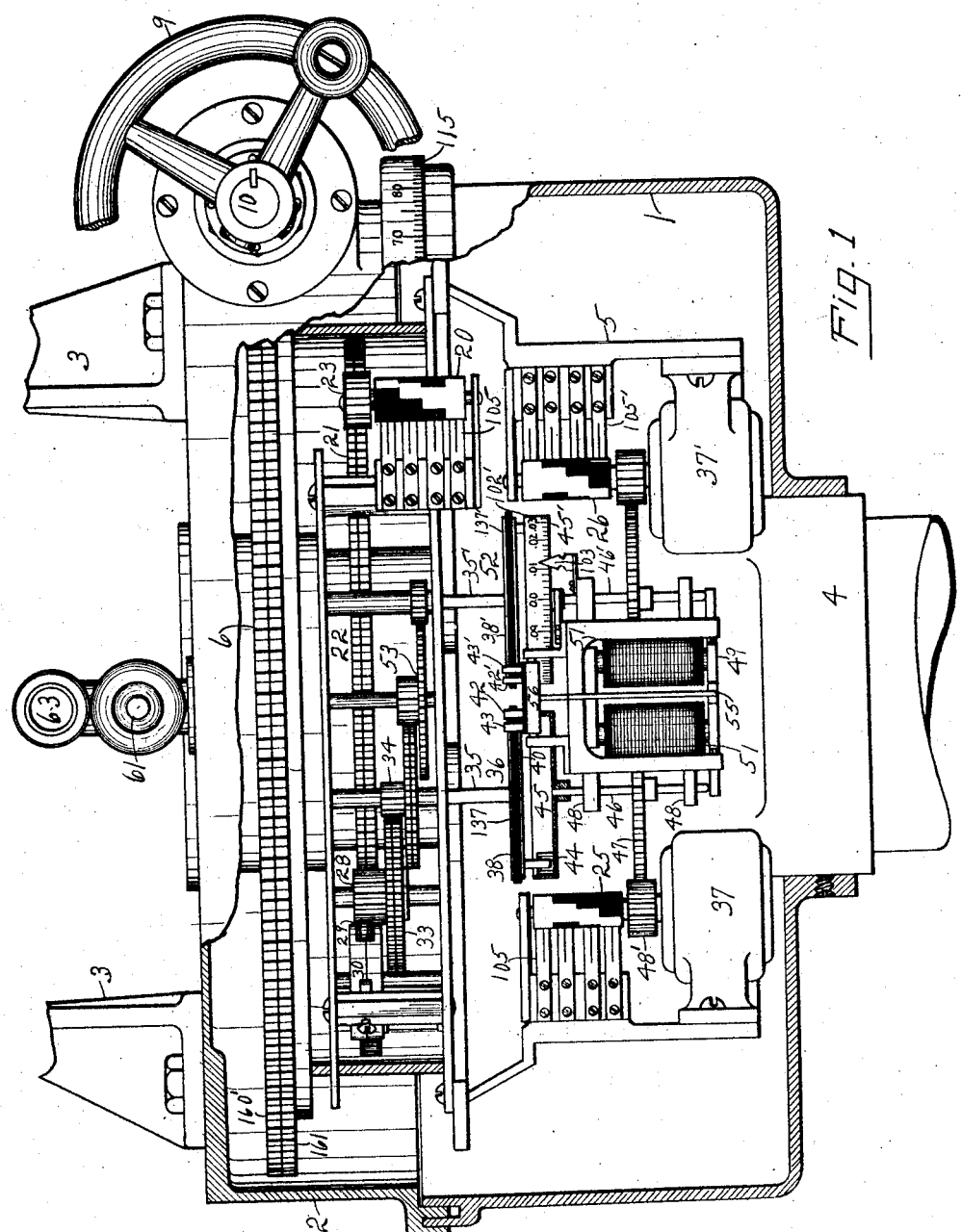
Figure 2:
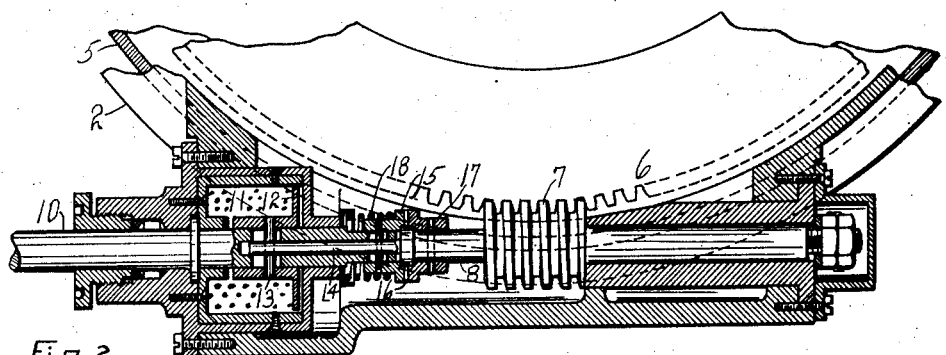
Figure 3:
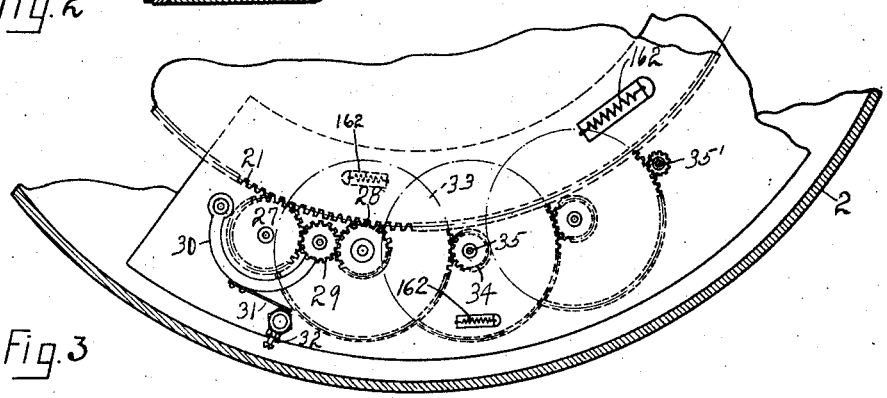
Figure 4:
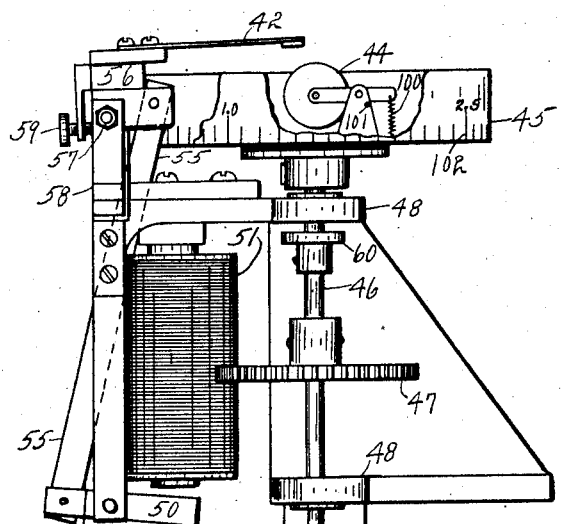
Figure 4A:
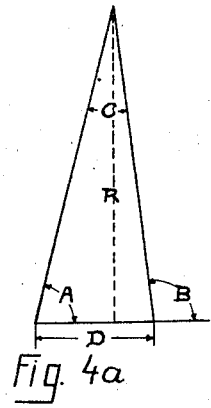
Figure 5:
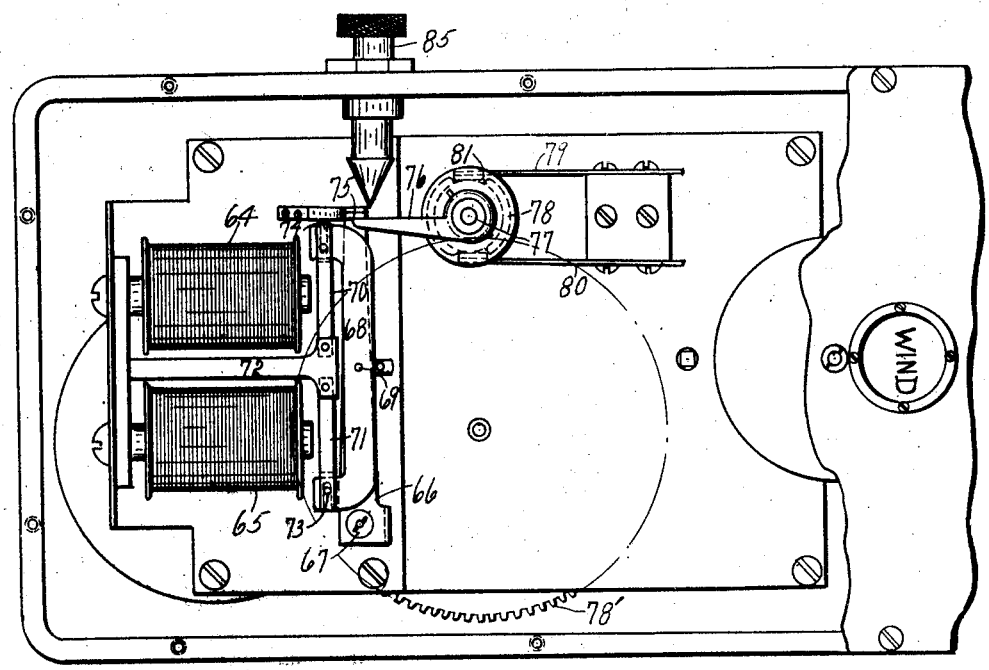
Figure 6:
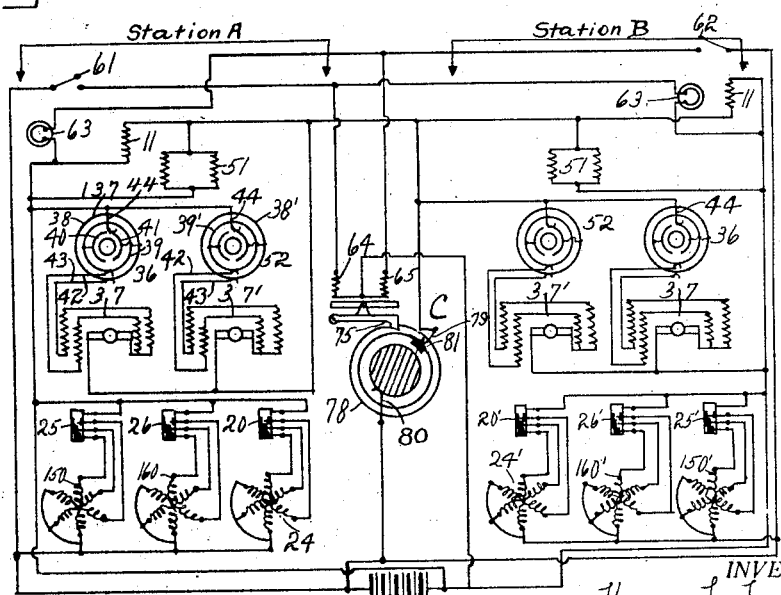

In the accompanying drawings Figure 1 is an elevation, partly in section, of one of the sighting instruments showing the transmission mechanism in place. Fig. 2 is a section of a portion of the clutch used in turning the instrument by hand. Fig. 3 is a detail of the reduction gearing used in connection with some of the transmitters. Fig. 4 is a side elevation of the automatic means for throwing certain of the transmitters in circuit upon a predetermined signal. Fig. 4ª is a diagram to illustrate the manner in which these instruments are used to determine the range. Fig. 5 is a plan view of a time contact device controlling the transmission mechanism. Fig. 6 is a wiring diagram of my complete transmission system.

As this invention relates particularly to the transmission mechanism, only so much of a sighting instrument is shown as is connected with the transmission mechanism. Also, only one transmission mechanism is illustrated in full, as the two instruments are preferably duplicates.

In Fig. 1 the reference numeral 1 denotes a portion of the main casing. On this casing is rotatably mounted the table 2 which carries the sighting telescope (not shown) on brackets 3. A scale 115 may be provided on table 2 so that the observed angle may be read at each sighting instrument. The main support or pillar 4 which carries casing 1 also carries by means of suitable brackets 5 all of the transmission mechanism and a large worm gear 6. The table is rotated by means of a worm 7 meshing with said worm gear 6 and mounted on a shaft 8. A handwheel 9 mounted on a second shaft 10 is used to normally rotate worm 7 but means are provided to render the handwheel inoperative upon a predetermined signal. This means (Fig. 2) consists of a solenoid 11, the movable core 12 of which is slidably but non-rotatably secured to shaft 10 as by means of a pin 13. Said pin is secured to a small shaft 14 which extends co-axially with shaft 10 and is secured adjacent its far end to a collar 15. Said collar is slidably mounted adjacent the end of shaft 10 and is provided with clutch teeth 16 adapted to engage complementary clutch teeth upon a collar 17 fixed to shaft 8. A spring 18 normally holds the clutch teeth in engagement but when solenoid 11 is excited it will be seen that the core 12 will be retracted and thus disengage clutch teeth 16 and prevent worm 7 from being rotated from handwheel 9.

The transmitter 20 which forms a part of my transmission mechanism is geared to a large gear 21 secured upon a central extension 22 from the table 2, a pinion 23 being provided for this purpose. Transmitter 20 may be of any approved type and is shown as a four-section rotatable commutator with four brushes 105, three of the sections being provided with alternate conducting and insulated portions, so spaced as to transmit impulses in rotation to a repeater motor such as motor 24 shown in the wiring diagram. Transmitter 20 is designed to transmit only the coarser readings of the angular position of the sighting instrument; that is, one stage of the transmitter may be made equivalent to from 1° to 5° rotation of the sighting instrument. In order to transmit the finer divisions of the angle, I employ one or more auxiliary transmitters 25, 26, one of which may be used, for instance, to transmit some fractional part of a degree, such as minutes or hundredths of a degree, while the other may be used to transmit even smaller fractions, such as seconds or thousandths of a degree. In order to secure such great accuracy it will be evident that transmitters 25 and 26 if connected directly as transmitter 20 would have to be continually rotated at a very high speed which would destroy their efficiency and seriously interfere with turning the entire sighting instrument. Accordingly, I provide novel means whereby these transmitters are not rotated continuously but are only actuated when the sighting instrument is brought upon the target and preferably also only when the sighting instrument is at rest. My idea is that since transmitter 20 will send out the main divisions of the angle the other transmitters need only send out the fractional parts thereof. Thus if the angle to be transmitted were 91.435° transmitter 20 would send out 90°, transmitter 25, 1.4° and transmitter 26, .035°. Transmitter 25 is connected with the instrument in the following manner:

A pair of gears 27 and 28 are mounted so as to mesh with the large gear 21. An idler 29 mounted on a pivoted arm 30 and meshing with both gears 27 and 28 may be provided to equalize the wear on both sides of the teeth of pinion 28 and to prevent losses through backlash of the teeth. A flat spring 31 secured to arm 30 and having its outer end bearing against an adjustable set screw 32 may be used to impart spring pressure to the arm 30.

Mounted on the shaft of pinion 28 is a larger gear 33 which meshes with a second pinion 34. The shaft 35 of pinion 34 carries one portion of a contact device 36 which is designed to control a motor 37. Contact device 36 is shown as consisting of a double-faced disk 137 mounted on a shaft 35, the upper portion of which is provided with slip rings 38 and 39 (see Fig. 6) and the lower portion of which is provided with a pair of reversing segments 40 and 41 which are connected with the corresponding slip rings. Disk 137 is made as light and with as small a moment of inertia as possible, since it is rotated at a very high speed when the table 2 is turned. I regard this as very important as a heavy disk with a comparatively large moment of inertia would introduce serious strains on the reduction gearing and produce errors in the readings transmitted, as explained hereinafter. In order also to reduce the power transmitted through this gearing, I provide means for holding the brushes adapted to contact with disk 137 out of contact with it except when it is stationary.

More specifically, the brushes 42 and 43 which are designed to contact with slip rings 38, 39 and the brush or trolley 44 which is designed to contact with the reversing segments 40 and 41 are normally held out of contact with their respective rings so that motor 37 is normally unexcited and disk 137 is free to revolve without the friction of the brushes. Special means are provided to throw the brushes into contact with disk 137 on a predetermined signal, the nature of which will be more fully explained hereinafter. Trolley 44 is pivotally mounted within a drum 45 secured to a vertical shaft 46. The trolley is preferably spring biased to operative position, as by spring 100, a pin 101 being provided to maintain the trolley in the proper position. Preferably drum 45 is provided with graduations 102, which are read in connection with a fixed pointer 103. Shaft 46 is provided with a gear 47 which meshes with pinion 48' driven by a motor 37 thereby providing a follow-up connection from the motor to the contact device. Shaft 46 is rotatably and slidably mounted in bearings 48 and is supported adjacent its lower end by member 49 which is secured to or forms a part of the armature 50 of an electro-magnet 51.

A contact system 52, similar to system 36 already described, is also provided for transmitter 26, the only difference being that the shaft 35' of drum 137' is rotated at a much higher speed than shaft 35, as by means of step-up gearing 53. Where possible all of the gears used in the transmission mechanism are made so as to take up the lost motion between the teeth. A simple method is to make the larger gears in two parts, 160', 161 (see worm wheel 6), connected by a spring 162 (Fig. 3) so that the space between the teeth is always filled. Said contact device 52 is preferably mounted adjacent device 36 so that a single mechanism may be used to close the circuit on both devices. The foot of shaft 46', therefore, of drum 45' also rests upon pivoted member 49 and is geared to a corresponding motor 37'. A link 55 is pivotally secured to member 49 adjacent one end and is connected adjacent its upper end to a member 56 pivoted at 57 to the frame 58. Member 56 carries the brushes 42, 43 and 42', 43' so that when said member is oscillated on its pivot the brushes are brought into contact with their respective slip rings. An adjustable stop 59 may be provided for member 56. The action of this portion of the mechanism is as follows:

Normally the brushes and trolleys are out of contact with disks 137 and 137' but when electro-magnet 51 is excited armature 50 is drawn up, thus pushing drums 45 and 45' upward, carrying with them trolleys 44 and causing the trolleys to contact with one or both of strips 40, 41 on each disk. A stop 60 may be provided on shaft 46 to limit its upward movement. At the same time link 55 causes member 56 to throw the four brushes down into contact with their slip rings thus rendering both contact mechanisms operative to actuate the motors 37, 37'. These motors preferably are of the reversible field type as shown in Fig. 6 and are so connected with the contact strips 40, 41 that the fields are reversed when the trolley crosses from one contact to the other, thus reversing the motor. The motors serve to drive the transmitters 25 and 26.

When the contacts are made, the motors 37, 37', through their following up connections 42, 43, 44, etc., bring the trolleys 44 around to the zero position by the shortest path, and at the same time rotate the transmitters 25 and 26 so that the repeater motors 150 and 160 in the receiving instrument will actuate an indicator which will reproduce the readings of drums 45 and 45' on which the trolleys are mounted.

The above described operation may be clearly understood by assuming that the brushes 42, 43 are in engagement with the slip rings 39, 38 and that the trolley 44 is in engagement with the contact 41. The following circuit is then established from one side of the battery S to the trolley 44, through contact 41, slip ring 38, brush 43, one of the oppositely wound fields of the motor 37, through the armature thereof, through the elements 79, 80 and to the other side of the battery S. This causes the motor 37 to rotate the trolley 44 in a direction toward the zero position with respect to the disk 137 until the trolley 44 is between the contacts 41—40, when the above traced circuit is broken. If on the other hand the brush 44 engages contact 40 on energization of electromagnets 51 the following circuit is established: from one side of battery S to the trolley 44, through contact 40, slip ring 38, brush 42, the other of the oppositely wound fields of the motor 37, through the armature thereof, through the elements 79, 80 to the other side of the battery S. This circuit causes the motor 37 to rotate the trolley 44 in a direction toward the zero position with respect to the disk 137 but in a direction opposite to the rotation caused by closure of trolley 44 on contact 41. This rotation continues until the trolley 44 is between the contacts 41—40 when the last traced circuit is broken. The circuits of the motor 37' are similar and need no further description.

In addition to bringing current into disk 137, the brushes 42 operate as a brake or stop to hold disk 137 from turning as the motor brings trolley 44 around to the zero position, the sliding friction of the brushes on rings 38, 39 being much greater than the rolling friction between trolley 44 and contacts 40, 41. The reason why it is desirable to have a brake operable directly on disk 137 is due to the fact while the worm 7 holds table 2 from turning, disk 137 has considerable freedom of vibration on account of the step-up gearing and the lost motion devices employed in connection therewith. It is important, therefore, that disk 137 be made light so as to come to rest quickly under the resilient centralizing influence of the centralizing devices 162, and that when it has come to rest, that a stop be applied thereto to prevent its turning with drum 45.

Coming now to the means for governing the period at which the motors are operated, it should be remembered that the two sighting instruments or stations A and B (Fig. 6) are designed to operate conjointly and to transmit the angles to a central station. It is therefore important that the two stations transmit their angles at the same time and only when each sighting instrument is on the target. A circuit closing means, such as buttons 61 and 62, is provided on the two instruments which the operator presses when his telescope is in the correct position. A lamp or other signaling device 63 is placed on each instrument in circuit with the button on the other instrument so that each operator may know when the other operator is ready to transmit. The electro-magnet 51, however, is not directly placed in these circuits, but special means are provided to insure the conditions (1) that both the telescopes are on the target and (2) that neither instrument is rotated while the angles are being transmitted. For this purpose I provide the auxiliary control instrument shown in Fig. 5 and also in the wiring diagram at C. This instrument preferably comprises a pair of electro-magnets 64 and 65 each of which is in circuit with one of the buttons 61 or 62. A novel form of linkage is provided to be actuated by said electro-magnets, which is so designed as to be operated only when both magnets are excited simultaneously. This linkage is shown as comprising a lever 66 pivoted at 67. Pivoted on said lever at 69 is a rocker arm 68. A pair of links 70 and 71 which also serve as the armatures of the electro-magnets 64 and 65 are pivoted adjacent their inner ends to a fixed post 72 and are pivotally and slidably secured adjacent their outer ends to the rocker arm 68 as by means of pins 73 on said arm and slots 74 in the ends of each of said links.

A stop 75 is provided adjacent the end of lever 66 against which a rotatable arm 76 is adapted to strike.

Arm 76 is mounted on a shaft 77 which is geared to a large gear 78' forming part of a clockwork (not shown in full). A spring-pressed releasing device 85 may be provided to release arm 76 from stop 75 manually if desired. Also mounted on shaft 77 is a contact drum 78 against which a pair of brushes 79 and 80 are adapted to bear. The portion of said drum against which brush 79 bears is provided with an insulated section 81 so that no current can flow when the parts are in the position shown in Figs. 5 and 6. As soon, however, as stop 75 is withdrawn by the conjoint action of magnets 64 and 65, the clockwork will revolve arm 76 and drum 78 until the magnets release the stop so that the arm again strikes it. During approximately a complete revolution current will pass from brush 80 to brush 79 through contact drum 78. These brushes are placed in circuit with all of the following electro-magnetic devices on each of the instruments A and B: first, the solenoid 11 which governs clutch 16, 17; second, electro-magnets 51 controlling contacts 36 and 52, and, third, the contacts 36 and 52 with their motors 37, 37'. It will be seen that the first, second and third groups of elements above described are shown connected in parallel with each other and in series with brushes 79, 80. The time that it takes the arm 76 to make a complete revolution is so adjusted as to allow the transmission mechanism sufficient time to transmit the angle, thus positively preventing rotation of the sighting instrument and of the disks 137, 137' while the brushes are in contact with said disks and while the transmitters 25 and 26 are being set.

The operation of the devices forming my invention will be readily understood, it is thought, without further explanation. While my method of transmitting the angles is well adapted for operating any form of indicator from the readings of which the range may be calculated, it is especially well adapted to the system of range calculation described in the copending application of Dr. Elemer Meitner for range calculating apparatus, filed June 18, 1915, Serial No. 34,807.

Fig. 4ᵃ illustrates very roughly a portion of the method employed. In this diagram A and B are the two angles made with the base line D. It will be readily apparent that R, the range, may be easily obtained if angle C is known, and also that C=B—A. But in actual practice it is found that C or B—A is found to lie between certain small limits, such as 5°. Hence to obtain the value B—A, it is not necessary to transmit the entire value of A and B, but only their values within 5°. The application of this to my invention will be apparent from the following example: If A were 88.125° and B were 91.263°, transmitter 20 need not be used. Transmitters 36 and 52 in station A would transmit 90—88.125 or 1.875°, while corresponding transmitters in station B would transmit 91.263—90 or 1.263°, the sum of which or 3.138° would give us the value B—A.

It should be noted that the repeater motors and transmitters (Fig. 6) are not placed in the interruptable circuit with device C and motors 37, but are continually in circuit with each other and with the supply source S. By this means I insure the repeaters remaining in step with their respective transmitters, while at the same time providing other means whereby the high speed repeaters are not actuated when the sighting instruments are being adjusted.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a transmission system, the combination with a sending instrument, of a transmitter connected thereto for transmitting steps of predetermined magnitude, a second transmitter for transmitting steps of less magnitude, and mechanically disconnected from said instrument and means for rotating said second transmitter when said first transmitter is at rest.

2. In a range finder a plurality of sighting instruments, manual setting means for each instrument, angle transmitting mechanism connected to each instrument, a switch on each instrument, means controlled by all of said switches adapted to render inoperative said setting means for a predetermined interval, when all of said switches are actuated.

3. In a range finder a plurality of sighting instruments, manual setting means for each instrument, angle transmitting mechanism associated with each instrument but normally disconnected therefrom, a switch on each instrument, means controlled by all of said switches for rendering said setting means inoperative and other means also controlled by all of said switches for rendering said transmission mechanism operative to transmit the angle.

4. In combination, a plurality of sighting instruments, a transmitter associated with each instrument, means controlled by each instrument for actuating a corresponding transmitter, a switch on each instrument and means for rendering said first mentioned means ineffective unless all of said switches are in a predetermined position.

5. In transmission mechanism, the combination with a sending instrument, of a contact device operable by said instrument, a reversible motor in a normally open circuit with said device, means for closing said circuit, a follow-up connection between said motor and said device and a transmitter operated by said motor.

6. Means for transmitting the angular position of a master instrument comprising a plurality of transmitters adapted to be connected with said instrument so as to be rotated at multiple speeds, and means for connecting certain of said transmitters only at the time the master instrument is in a desired position.

7. In transmission mechanism, the combination with the master instrument, of a transmitter continuously actuated by said instrument, a portion of a contact device connected with said instrument so as to rotate at a higher speed than said transmitter, a complementary portion of said device, the two portions being normally out of contact, a translating device controlled by said contact device, a follow-up connection between the translating device and said complementary portion, a second transmitter driven by said translating device, and controllable means for closing the two portions of said contact device.

8. In a range finder, the combination with two sighting instruments movable at variable angles to a given base line, of a portion of a contact device connected with each instrument, a complementary portion of said device located adjacent thereto but normally out of contact therewith, a translating device controlled by each contact device, a follow-up connection between the translating device and said complementary portion, a transmitter driven by each translating device, mechanism on each instrument for closing the two portions of each contact device, and interconnected governing means for both of said mechanisms, whereby said transmitters are only rotated when said governing means are simultaneously actuated.

9. In a range finder a plurality of sighting instruments, manual setting means for each instrument, angle transmitting mechanism connected to each instrument, a switch on each instrument, means controlled by all of said switches adapted to render inoperative said setting means for a predetermined interval, when all of said switches are actuated, and a signal on each instrument controlled by a switch on one of the other instruments.

10. In a range finder, a plurality of sighting instruments, angle transmitting mechanism associated with each instrument, but normally disconnected therefrom, a switch on each instrument, and a signal on each instrument controlled by a switch on one of the other instruments.

11. In a range finder, the combination with a master instrument, of step-up gearing connected thereto, said gearing containing a resilient, lost motion device, a contact member rotated by said gearing, a complementary contact member, means for causing said second member to assume a fixed position with respect to said first member, a brake for said first member and means for bringing said two members together and for simultaneously applying said brake.

12. In a range finder, the combination with a master instrument, of step-up gearing connected thereto, said gearing containing a resilient, lost motion device, a contact member rotated by said gearing, a complementary contact member, means for causing said second member to assume a fixed position with respect to said first member, a brush for said first member, said brush serving to introduce current to said first member and also acting as a brake.

13. In angle transmission mechanism, a resiliently centralized, rotatably supported contact disk, means for transmitting to a distance the position of said disk comprising a member adapted to follow the said disk, a frictionless trolley mounted on said member, a non-rotatable friction brush, means for bringing said brush and trolley into substantially simultaneous engagement with said disk, a transmitter, and means in circuit with said disk, brush and trolley for actuating both said transmitter and said follow-up member.

14. Means for transmitting the angular position of a master instrument comprising a plurality of transmitters adapted to be connected with said instrument so as to be rotated at multiple speeds, and means for preventing turning of the master instrument during the time taken to transmit the angle readings.

15. In a range finder a plurality of sighting instruments, manual setting means for each instrument, angle transmitting mechanism connected to each instrument, a switch on each instrument, means for preventing turning of each instrument and means responsive only to the actuation of all of said switches for rendering said preventing means operative.

16. In transmission mechanism, the combination with a sending instrument, of a contact device operable by said instrument, a reversible translating device in a normally open circuit with said contact device, means for closing said circuit, a follow-up connection between said translating device and said contact device, a transmitter operated by said translating device and a repeater motor in a closed circuit with said transmitter, whereby said repeater motor is only actuated when said contact device is closed, but is continuously in circuit with its transmitter.

17. Means for transmitting the angular position of a master instrument comprising a plurality of transmitters adapted to be connected with said instrument so as to be rotated at multiple speeds, means for connecting certain of said transmitters only at the time the master instrument is in a desired position, and means for preventing turning of the master instrument during the time taken to transmit the angle readings.

18. In a transmission system, the combination with a sending instrument, of a transmitter connected thereto for transmitting steps of predetermined magnitude, a second transmitter for transmitting steps of less magnitude, a reversible translating device connected to said second transmitter, a reversing switch operable by said instrument and by said translating device, and means for opening and closing a circuit between said translating device and said switch.

19. In a range finder, a sighting instrument, an angle transmitting mechanism associated with said instrument, means connecting said instrument and mechanism, and means controllable at will for rendering said first mentioned means effective, or for rendering said first mentioned means ineffective without preventing the actuation of said instrument.

20. In a range finder, a sighting instrument, an angle transmitting mechanism associated with said instrument, but normally disconnected therefrom, means for rotating said instrument, means for rendering said mechanism operative, and means for simultaneously preventing rotation of said sighting instrument.

21. In transmission mechanism, the combination with a sending instrument, of a contact device operable by said instrument, a reversible translating device controlled by said device, means for rendering said device effective or ineffective to control said translating device, a follow-up connection between said devices and a transmitter operated by said second named device.

22. In combination, a sending instrument, means for transmitting a reading of said instrument when the latter is stationary and means for preventing movement of said instrument while said reading is being transmitted.

23. In combination, a sending instrument, means controlled by said sending instrument for transmitting a reading of said instrument when the latter is stationary and means for preventing movement of said instrument while said reading is being transmitted.

24. In a range finder, a sighting instrument, angle transmitting mechanism associated with said instrument, but normally inoperative, a second transmitting mechanism connected to said instrument and means for rendering said first named mechanism operative at will.

25. In combination, a sighting instrument, a transmitter, means controlled by said instrument for actuating said transmitter, and means for preventing operation of said first named means on movement of said sighting instrument.

26. In combination, a sighting instrument, a transmitter, means controlled by said instrument for actuating said transmitter, and means controllable at will for preventing operation of said first named means on movement of said sighting instrument.

27. In combination, a sending instrument, manually operable means for moving said sending instrument, means controlled by said sending instrument for transmitting a reading of said instrument when the latter is stationary and means for preventing manual movement of said instrument while said reading is being transmitted.

In testimony whereof I have signed my name to this specification this 4th day of June, 1915.

HARRY L. TANNER.